United States Patent
Barkley et al.

[11] Patent Number: 5,867,458
[45] Date of Patent: Feb. 2, 1999

[54] MAGAZINE FOR HOLDING COMPUTER DATA STORAGE CARTRIDGES

[75] Inventors: John A. Barkley, Longmont; Stephen Ward Graeber, Louisville; Robert John Schaefer, Boulder, all of Colo.

[73] Assignee: Breece Hill Technologies, Inc., Boulder, Colo.

[21] Appl. No.: 755,478

[22] Filed: Nov. 22, 1996

[51] Int. Cl.⁶ .......................... G11B 15/68; B65D 85/672
[52] U.S. Cl. .......................... 369/36; 360/92; 206/387.15
[58] Field of Search ............................. 369/36, 178, 191; 360/92; 206/387.15; 211/40

[56] References Cited

U.S. PATENT DOCUMENTS

| | | | |
|---|---|---|---|
| 3,565,282 | 2/1971 | Staar | 221/83 |
| 4,240,551 | 12/1980 | Osanai | 206/387 |
| 4,270,817 | 6/1981 | McRae | 312/15 |
| 4,850,485 | 7/1989 | Ishikawa | 206/387 |
| 5,021,902 | 6/1991 | Ishikawa et al. | 360/92 |
| 5,231,552 | 7/1993 | Schneider et al. | 360/92 |
| 5,532,888 | 7/1996 | Acosta et al. | 360/92 |
| 5,537,268 | 7/1996 | Felde et al. | 360/92 |

FOREIGN PATENT DOCUMENTS

| | | | |
|---|---|---|---|
| 63-293747 | 11/1988 | Japan | 360/92 |
| 1-178160 | 7/1989 | Japan | 360/92 |
| 3-125369 | 5/1991 | Japan | 360/92 |
| 4-010266 | 1/1992 | Japan . | |
| 5-012821 | 1/1993 | Japan . | |
| 5-109166 | 4/1993 | Japan . | |
| 7-261871 | 10/1995 | Japan . | |
| 7-272365 | 10/1995 | Japan . | |

*Primary Examiner*—Stuart S. Levy
*Assistant Examiner*—William J. Klimowicz
*Attorney, Agent, or Firm*—Lee, Fishman & Isaac; Daniel N. Fishman; John L. Isaac

[57] ABSTRACT

A computer data storage cartridge magazine for carrying data storage cartridges from conventional "off-line" storage to a storage library subsystem where cartridges may be electronically read or written. The magazine comprises a series of horizontally arranged slots. Each slot has a front spring lever which is operated by the user to insert and remove individual cartridges and a rear locking lever which is operated by the robotic mechanisms of the library subsystem. A safety bar extends substantially the length of the magazine and is located under the rear locking levers. The safety bar acts to ensure that the rear locking levers do not become accidently depressed when the magazine is carried by the user. The safety bar is disengaged by a mated pin when the magazine is inserted into the library subsystem. The rear locking levers may then be actuated (depressed) by an arm on the robotic mechanism of the library subsystem. When the rear locking levers are so depressed, cartridges may be inserted or removed from the rear of the magazine by the robotic mechanisms of the storage library.

14 Claims, 8 Drawing Sheets

MAGAZINE FOR HOLDING COMPUTER DATA STORAGE CARTRIDGES

FIELD OF THE INVENTION

The present invention relates to computer data storage libraries, and in particular to a removable magazine for holding computer data storage cartridges.

PROBLEM

Computer data storage libraries provide large capacity secondary data storage in a computer. Data is typically stored on cartridges. Robotic mechanisms within the storage library subsystem move cartridges between slots in which the cartridges are stored and between the slots and the electronic read/write devices within the storage library which manipulate data on the cartridges. The cartridges typically have information stored on them magnetically or in optically readable code. A plurality of cartridges can be housed in slots of removable magazines in the storage library. Use of such removable magazines make it easier to manage a large number of cartridges. A magazine holding a plurality of cartridges can be easily loaded or unloaded from the storage library.

The magazines are loaded from a conventional storage rack which is not accessible to the library, to a mated slot in a storage library subsystem where the individual cartridges are mechanically accessible to the library subsystem. A robotic loading device in the library mechanically retrieves a cartridge and carries it to a read/write device within the library for processing.

It is a particular problem to design a magazine which has access to the cartridges from both the front and the rear, while allowing the magazine to be carried by the user without spilling cartridges. In an appropriately designed library subsystem, a user may be allowed access to the cartridges through the front side of the magazine while the robotic mechanism of the library accesses the cartridges from the rear side of the magazine. Access from the front of a magazine in an appropriate storage library subsystem allows a user to load and unload individual cartridges, while access from the rear allows the robotic mechanisms of the library to manipulate cartridges.

It is also necessary that the magazines are portable. It should be easy for the user to carry the magazine from "off-line" storage to the library subsystem without spilling the cartridges. Therefore the cartridges must be locked into the magazine. On the other hand, cartridges must be easily accessible to both the user and to the library robotics. It is advantageous that extracting and inserting individual cartridges into the magazine be both ergonomic and intuitive to the user. Access of the cartridges to the library robotics should be mechanically simple to enhance reliability and prevent mechanical failure such as jamming of the cartridges.

A further design goal is for simplicity of design so that the magazine is easy to manufacture. Prior art magazine designs are complex and have a large number of moving parts such as in Schneider et al. (U.S. Pat. No. 5,231,552) where a relatively complicated push-push mechanism is used.

SOLUTION

The present invention provides a data storage cartridge magazine which provides simple solutions to the above problems and provides other advantages while being intuitive and easy to use. The magazine has horizontally arranged cartridge slots which each have front spring levers and rear locking levers. The front spring levers are mechanically depressed by the user to release a cartridge for insertion or extraction through the front of the magazine. The front spring levers are operated individually and are accessible to the user even when the magazine is loaded into the library. The simple, manually operated spring lever mechanism is highly intuitive to use.

The rear face of the magazine, the face presented to the robotic mechanism in the storage library, is also simple. The rear locking levers of the magazine are operated by a mechanical lever on the robotic mechanism of the library. The mechanical lever pushes down on the rear locking levers to release an individual cartridge. This simple arrangement of the rear locking levers reduces the chance that mechanical failure will occur such as jamming of the cartridges due to failure of the release mechanism.

In an important aspect of the invention, the rear locking levers are provided with a safety bar which extends the length of the magazine and is common to all the rear locking levers. When the safety bar is engaged, it prevents the rear locking levers from being depressed. The loading device has an arm which disengages the safety bar. The safety bar is important because it prevents cartridges from accidently falling out of the back of the magazine when it is carried by the user. The safety bar is recessed within the magazine to prevent inadvertent release of the rear locking levers by a user when the magazine is outside the storage library subsystem.

The magazine is designed to be held by a user by handles in the front. Therefore the rear locking levers will be on the downward side when the magazine is carried. The safety bar helps prevent unintentional release of a cartridge down through the rear of the magazine when a user, carrying the magazine, accidentally jars the magazine. Only the robotic mechanism of the library, with the safety bar released by the library subsystem, can easily remove cartridges from the magazine through the rear of the magazine.

The magazine of the present invention is relatively simple to manufacture. The locking levers are mechanically simple and therefore less likely to fail from repeated use as compared to prior designs. The handles and levers are a molded, integral, parts of the magazine's frame and have no additional moving parts. The magazine further has braces which help prevent the magazine from being crushed or substantially deformed.

Therefore, the present invention provides a magazine which is simple and easy to use while overcoming the problems arising from many, and sometimes conflicting, design goals. The present invention provides easy and intuitive access to cartridges by a human user from the front while providing reliable robotic access to cartridges from the rear. It is easy to manually insert or extract cartridges from the magazine. On the other hand, the cartridges are securely held in the magazine while it is carried by the user. These goals are all accomplished with a magazine which is easy to manufacture and relatively inexpensive.

DETAILED DESCRIPTION OF THE PREFERRED EMBODIMENT

Figure 1:
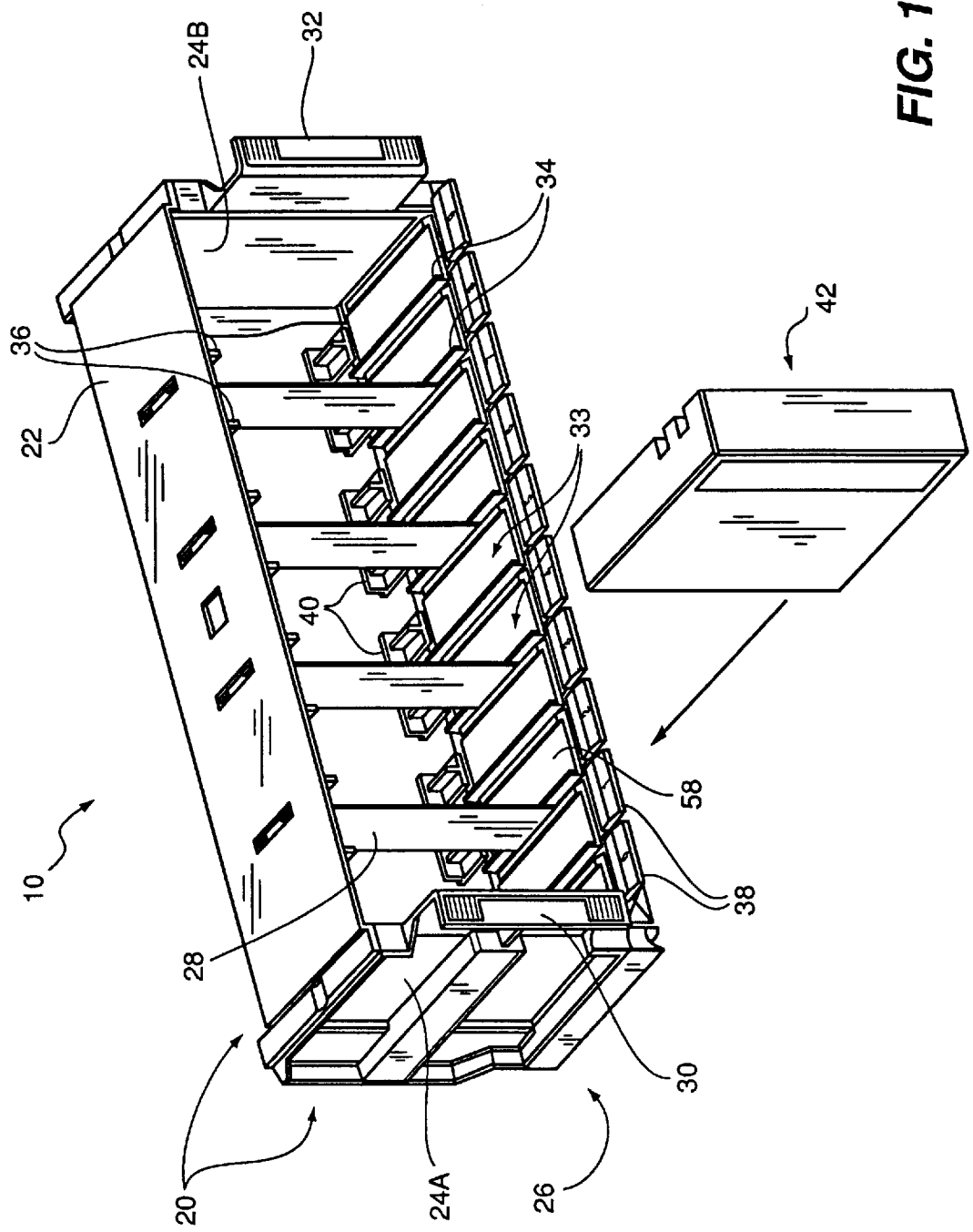
FIG. 1 shows a perspective front view of the magazine of the present invention.

FIGS. 1–8 show a preferred embodiment of the data storage cartridge magazine according to the present invention. Data cartridge magazine 10 (FIG. 1) includes frame 20 comprising a top 22, sidewalls 24a and 24b, a slot floor 58, and left and right handles 30 and 32. A bottom cover 26 (FIG. 3) is attached to frame 20 by means of screws (not shown) which extend through screw holes 90 (FIG. 8) in bottom cover 26 and into the underside of slot floor 58. The top, sidewalls and slot floor are made of pieces of molded plastic or other rigid material which are fused together.

The magazine frame has dimensions as appropriate for storing a plurality of cartridges. The precise number of such cartridges and the precise dimension of such cartridges depend upon the intended application of the cartridges and the magazine. For example, the magazine may be used to hold a plurality of tape media cartridges, such as any of several industry standard ½ inch tape cartridges. In the best presently known mode of practicing the invention, ten storage cartridges are stored in the magazine. The approximate dimensions of the frame in the best presently known mode of practicing the invention are therefore: a horizontal length of about 12 inches, a depth of about 3 inches, and a height of about 4 and ¼ inches from slot floor 58 to top 22.

The frame further has a series of braces 28 for preventing the frame from being crushed. In the preferred embodiment braces are arranged between every other slot and are made of metal. One of ordinary skill will recognize many equivalent arrangements having braces, for example, between every slot or every third slot etc., or for example, other rigid materials such as plastic could be used for the braces. The braces are preferably attached to top 22 of the frame by means of tabs 68 (FIG. 4) which are an integral part of the braces. Tab recesses 64 have a depth sufficient to accommodate frame tabs 68 so that the tabs are flush with the frame top surface. Frame tabs 68 are inserted through tab slots 66 and then twisted to secure the braces. The braces are similarly attached to slot floor 58.

Figure 4:
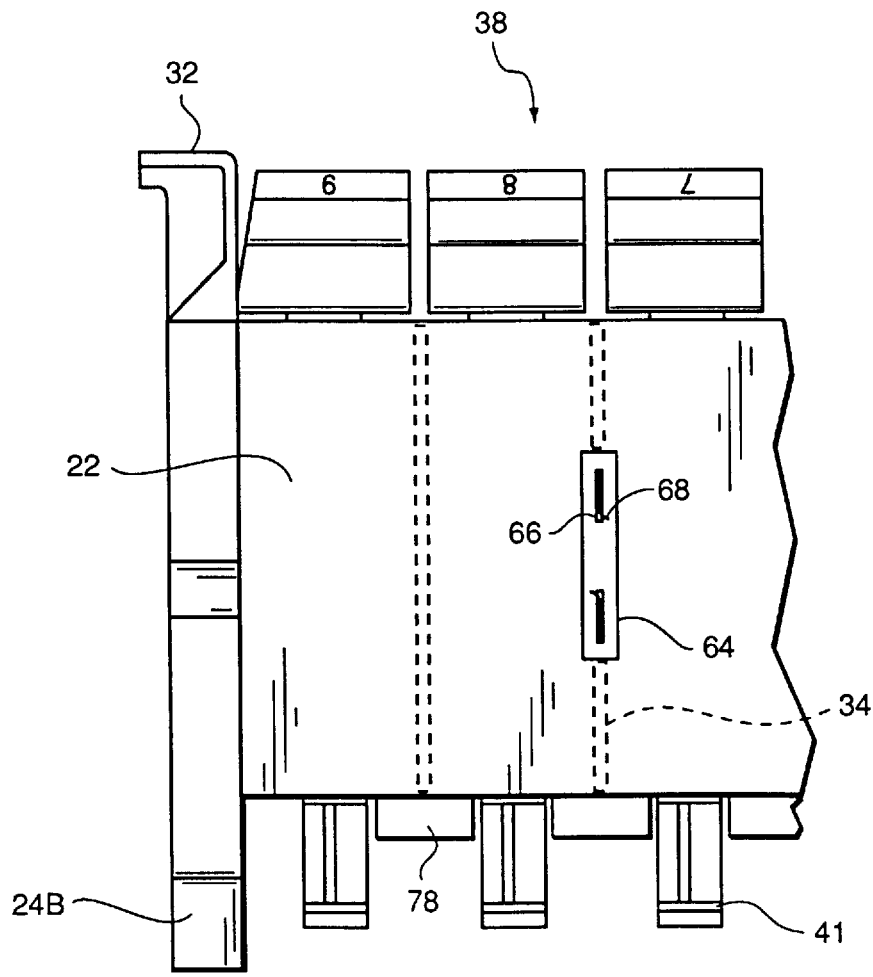
FIG. 4 is a partial top view of the magazine.

Frame 20 further has left and right handles 30 and 32 for carrying the data storage cartridge magazine. The handles extend beyond top 22 and slot floor 58 in order to protect front spring levers 38 (FIG. 4). Sidewalls 24a and 24b extend beyond the other side to protect rear locking levers 40. In the preferred embodiment the handles are an integral part of sidewalls 24a and 24b but they may alternatively be fused or bolted to the sidewalls. The handles are about 3 inches high, but they may alternatively extend the full height of the frame or another distance sufficient to provide a hand grip to the user.

Figure 5A:
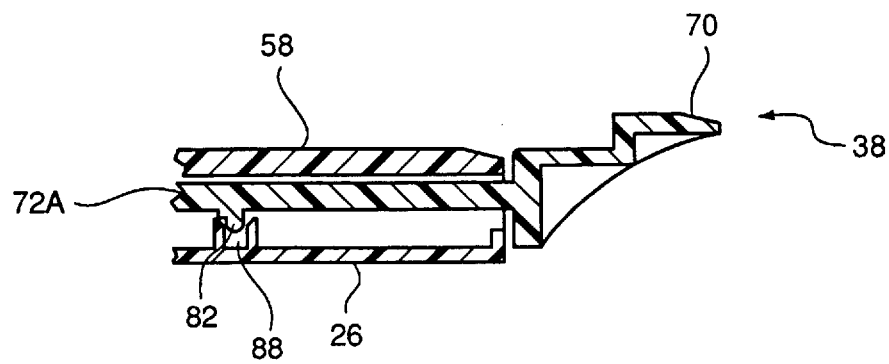
FIGS. 5a and 5b are cross-sectional views of the front spring levers in the closed and open positions, respectively.
Figure 5B:
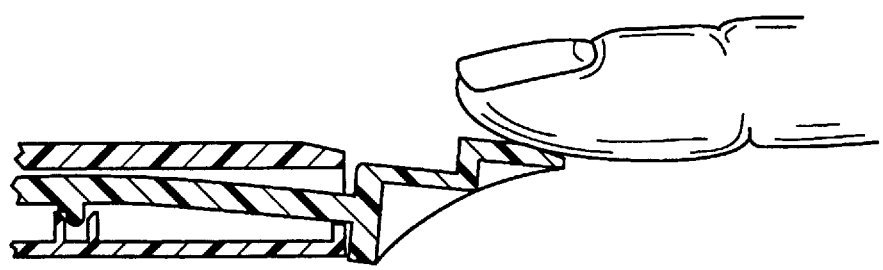

Frame 20 surrounds a series of horizontally arranged slots 33 (FIG. 1). In the preferred embodiment there are ten slots, but there may be any reasonable number of slots. The slots are delineated by lower slot partitions 34 and upper slot partitions 36. Slot partitions 34 and 36 are made of plastic and are an integral part of frame 20. Alternatively they may be attached to the frame by any known means such as glued or snapped into position. The slot partitions extend substantially the depth of each slot. Slot partitions positioned at braces 28 are divided into two separate sections, one on each edge of the partition. The slot partitions are tapered at both ends to facilitate guiding cartridges into slots. Slot floor 58 is also tapered for this reason (FIG. 5a).

Figure 7:
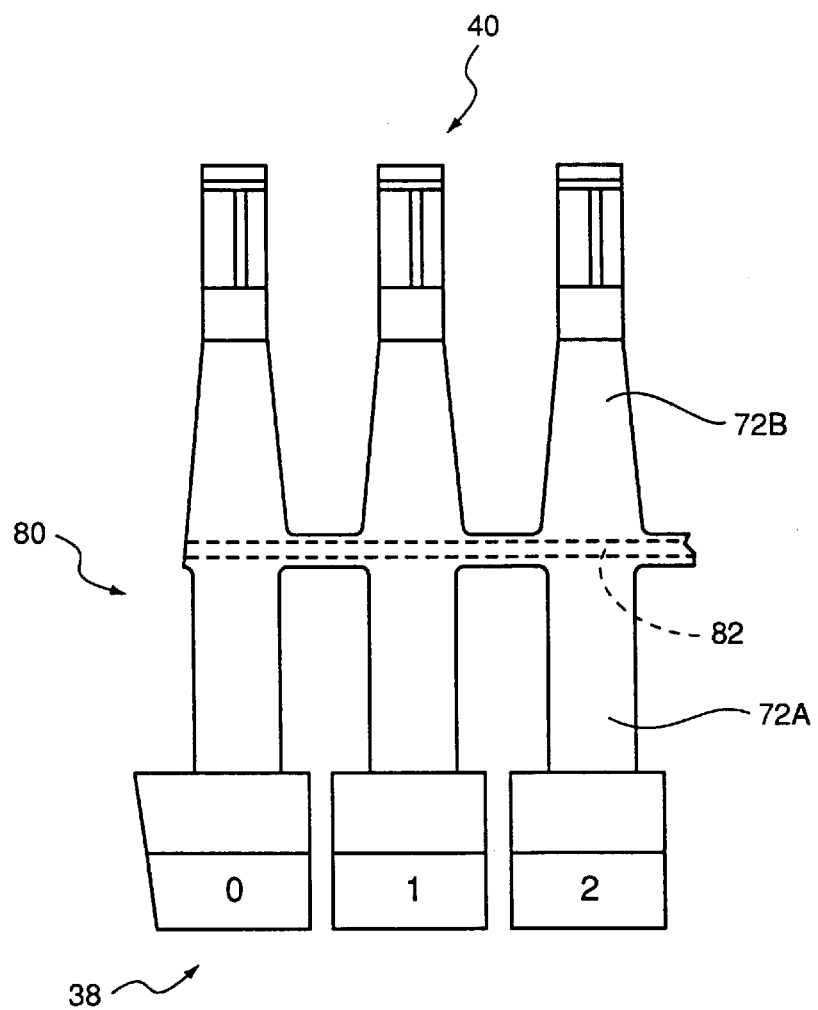
FIG. 7 is a plan view of the lever assembly.
Figure 8:
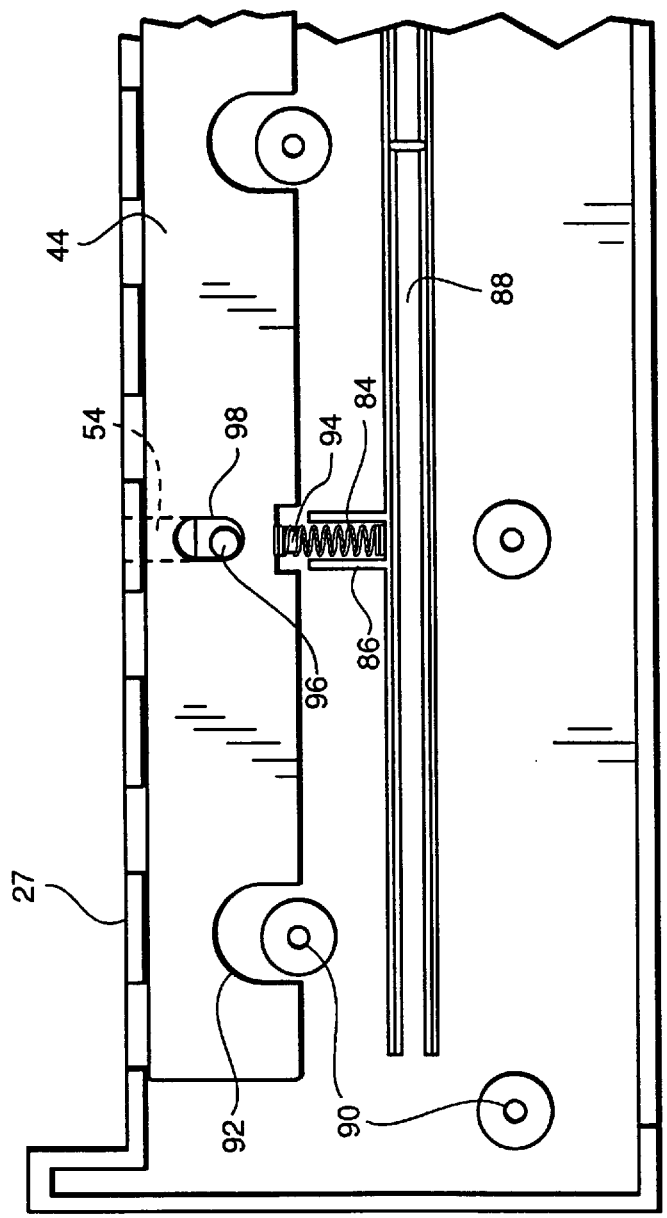
FIG. 8 is a plan view of bar.

Along the front of frame 20 are a series of front spring levers 38 (FIG. 1), one corresponding to each slot 33. Front spring levers 38 are operated by the user pushing down on them to insert or extract cartridges. Each front spring lever 38 has a lip 70 (FIG. 5a) and a front elongated portion 72a (FIG. 7). The lip has a number embossed on it for manual identification of the slot. Lip 70 prevents cartridges from sliding out the front of slots 33. The front elongated portion 72a is flexible and provides the spring action for the front spring lever. The far end of the front elongated portion 72a meets the rear elongated portion 72b of the rear locking lever 40 to form a single piece, the lever assembly 80 (FIG. 7). On the underside of lever assembly 80 is a ridge 82 which slips into a canal 88 (FIG. 8) formed on bottom cover 26. In this way the lever assembly is easily aligned and attached to bottom cover 26. The portion of spring lever 38 extending beyond slot floor 58 is preferably about 1 inch wide and about 1 inch deep. The entire lever assembly is preferably made of a single piece of plastic, but other flexible materials could also be used.

Along the rear of the frame is a series of rear locking levers 40 (FIG. 2), one for each slot. The rear locking levers are operated by a mechanical lever 46 (part of the robotic mechanism within the storage library) which has a finger 48 for engaging and depressing rear locking levers 40. A cartridge is then grabbed from a slot by a series of rollers 52a and 52b (also part of the robotic mechanisms of the storage library) which transfer the cartridges to an electronic read/write device in the storage library where it is electronically read or written. Each rear locking lever has a lip 41 which is engaged by a mechanical finger 48. Each rear locking lever further consists of vertical support fins 74a, 74b and 74c (FIG. 6a) and a lever stop 56, all of which are made of plastic and molded into one piece. A rear elongate portion 72b is made of plastic and is flexible to provide the spring action. The rear elongated portion meets the front elongated portion (FIG. 7). In the preferred embodiment the rear locking levers have a width of about ⅓ inches, i.e. narrower than the front spring levers, and a length of about 1 inch of the portion extending beyond slot floor 58. The height of the lip is about ⅓ inches. The rear locking levers are surrounded by ledges 78 (FIG. 4) having dimensions of about 1 inch in length and ⅓ inches in depth. Ledges 78 help guide cartridges into the slots.

The precise dimensions of the front spring levers and the rear locking levers depend upon the dimensions of the storage cartridges and upon the materials used to form the levers. The spring force required to depress the levers to release or insert a cartridge should be high to prevent inadvertent release of a cartridge while low enough to permit easy release or insertion of a cartridge by a human through the front of the magazine. One of ordinary skill in the art will determine the dimensions and spring force appropriate for a particular application of the magazine of the present invention.

Figure 6A:
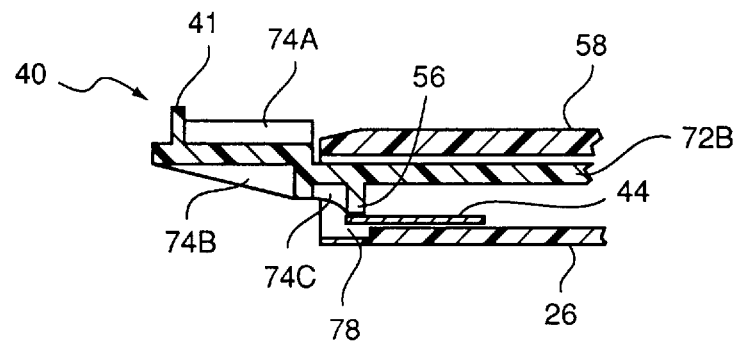
FIGS. 6a and 6b are cross-sectional views of the rear locking levers in the closed and open positions, respectively.

Locking of rear locking levers 40 is accomplished with a safety bar 44 (FIG. 2) extending substantially the length of frame 20. Safety bar 44 is preferably made of metal, is about 10 inches long, ¹⁄₁₆ inches thick and about 1 inch wide. It rests on the top surface of frame bottom 26 (FIG. 6a). The safety bar is guided by pegs 96 (FIG. 8) extending from frame bottom 26 through oval-shaped holes 98 in the safety bar. The safety bar is kept in the forward and locked position by a spring 84 attached to both ends of the bar. Spring 84 slips over a spring tab 94 cut out of the safety bar. The other end of spring 84 is held in place by a spring holding wall 86 which is a raised portion of bottom cover 26. Safety bar 44 further has arches 92 cut out of it to provide clearance around screw holes 90. A bar disengage slot 54 (FIG. 3) provides access to a mechanical pin (not shown) which pushes the safety bar backward to the unlocked position. The bar disengage slot is a notch in bottom cover rear face 27 which measures about ½ by ½ inches.

Figure 6B:
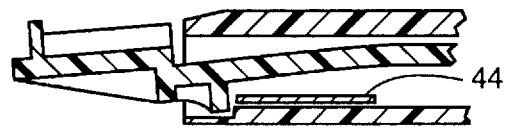

In its forward and locked position the safety bar 44 covers a lever travel space 78 (FIG. 6a) and is directly under lever stop 56. Bar travel space 78 (FIG. 6a) consists of a notch in bottom cover rear face 27 and being just slightly wider than rear locking lever 40. In its back or unlocked position the safety bar is completely clear of lever travel space 78 and lever stop 56 (FIG. 6b).

In operation of the preferred embodiment a user loads data cartridges 42 (FIG. 1) into the data cartridge magazine by pushing down on front spring levers 38 with a finger or with a cartridge. Cartridges are pushed into a slot until the user feels the cartridge is stopped by a rear locking lever or until a cartridge is past the lip of the front spring lever 38. Cartridges are loosely held in a slot by upper and lower partitions 36 and 34 and front spring lever 38 and rear locking levers 40. A user carries magazine 10 by handles 30 and 32. The handles are positioned in the front of the magazine, therefore when it is carried the rear locking levers will be on the downward facing side of the magazine. The safety bar insures that the rear locking levers do not become accidently depressed and spill cartridges.

Figure 2:
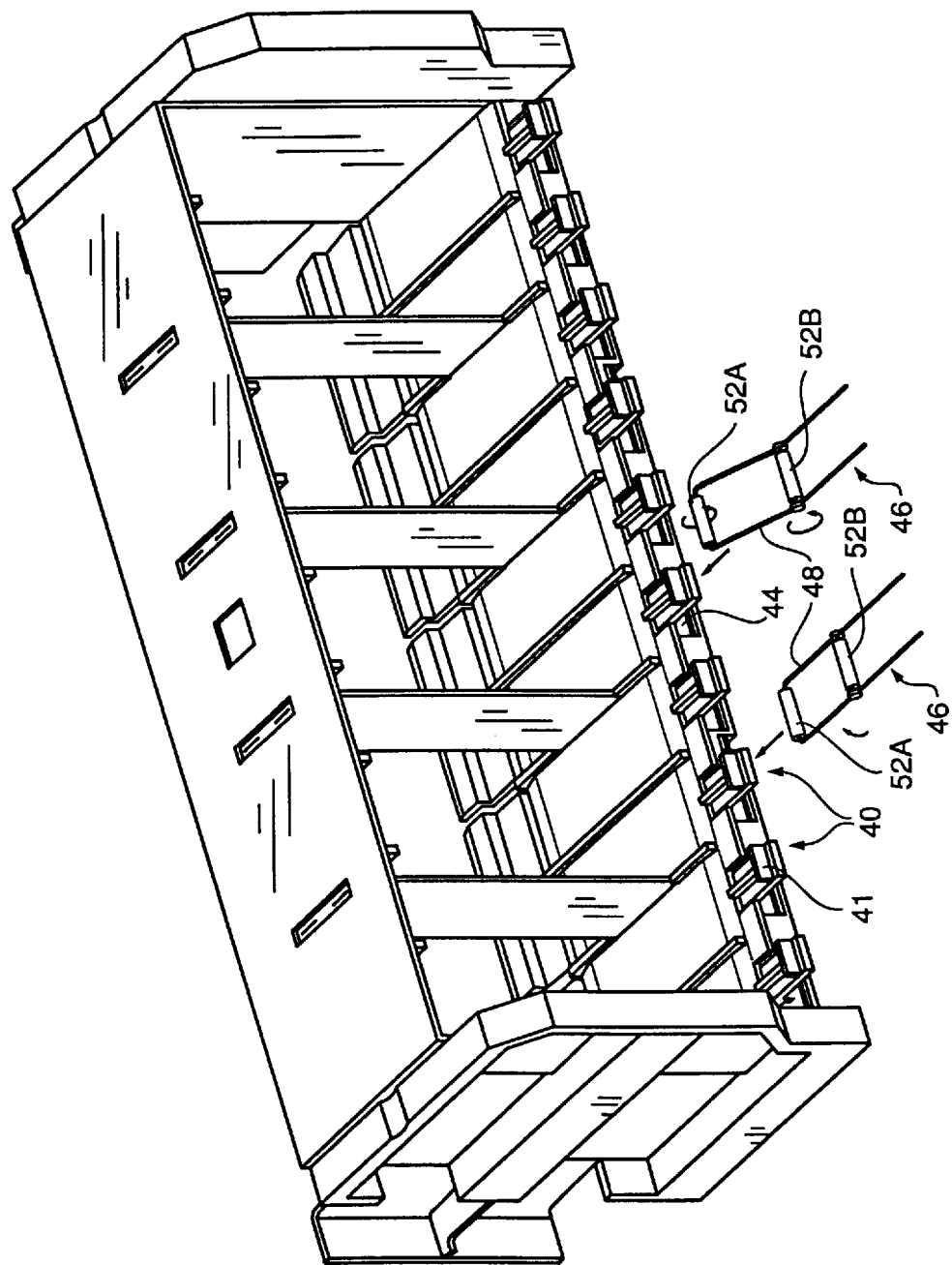
FIG. 2 shows a perspective rear view of the magazine of the present invention.
Figure 3:
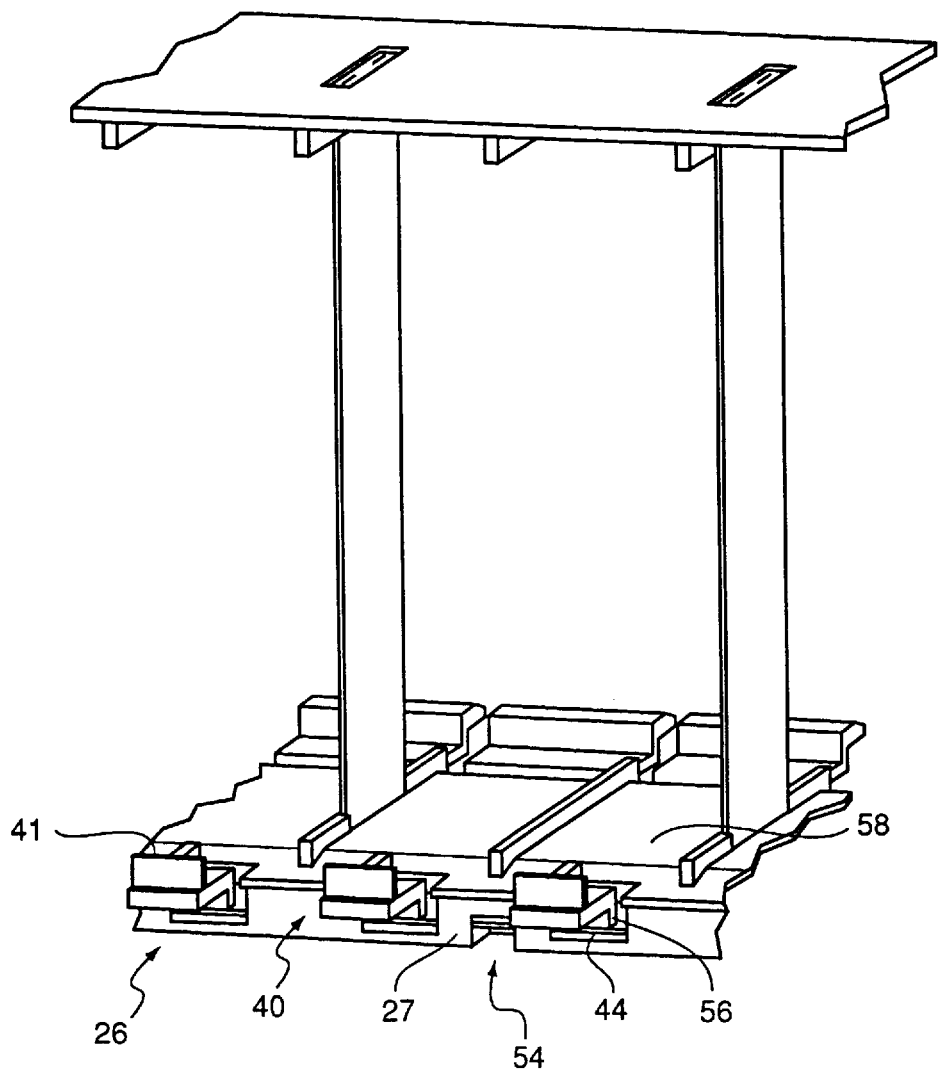
FIG. 3 shows a perspective cut-away rear view highlighting details of the rear locking levers.

The safety bar will automatically be held by spring force in the locked position as shown in FIG. 6a. The magazine is then inserted into the storage library subsystem. FIG. 2 shows components within the library subsystem. The library includes a mechanical pin (not shown) which is inserted into bar disengage slot 54 (FIG. 3) to push back the safety bar to the unlocked position. When the magazine is inserted into the library, the mechanical pin inserts in the bar disengage slot 54 to release the lock on the rear locking levers. A mechanical finger 28 (FIG. 2), responsive to requests to retrieve a cartridge from a slot or to insert a cartridge into a slot, depresses the now unlocked rear locking lever 40 corresponding to the selected slot into the downward position shown in FIG. 6b. A series of rollers 52a and 52b then transfers a cartridge into or out of the slot. After this operation, the finger is withdrawn returning the rear locking lever to its nominal position.

There has been described a data cartridge storage magazine which solves many of the problems inherent in such a device. The front spring levers are intuitive and easy to use. The rear locking levers are securely held in place by the safety bar to ensure that cartridges are not released when the magazine is carried. The magazine is light in weight and easy to carry. The lever mechanisms are relatively simple and easy to manufacture. It is evident, now that the invention has been fully described, that those skilled in the art may make numerous uses and modifications of the specific embodiment described without departing from the inventive concept.

What is claimed is:

1. A magazine for holding data storage cartridges comprising:

a frame surrounding a plurality of slots adapted to hold data storage cartridges, wherein a front side of said plurality of slots is associated with a front side of said frame and a rear side of said plurality of slots is associated with a rear side of said frame;

front means, associated with said front side of each of said plurality of slots, for preventing data storage cartridges from exiting said front side of said slots by the force of gravity when said frame is tipped at any angle, and wherein said front means are operable to allow an individual data cartridge to be inserted or extracted from said front side of said frame by depression of said front means;

rear means, associated with said rear side of each of said plurality of slots, for preventing data storage cartridges from exiting said rear side of said slots by the force of gravity when said frame is tipped at any angle, and wherein said rear means are operable to allow an individual data cartridge to be inserted or extracted from said rear side of said frame by depression of said rear means;

a safety bar associated with said rear means operable to lock said rear means by preventing said depression of said rear means, wherein said safety bar is operable independent of said depression of said rear means; and retaining means for biasing said safety bar in a direction toward the rear side of said frame to prevent depression of said rear means, whereby in order to enable depression of said rear means, a force exceeding the force of said retaining means is applied to said safety bar in a direction toward said front side of said frame such that said safety bar is linearly slid in a direction toward said front side of said frame.

2. The magazine of claim 1 wherein said front means comprises a plurality of front spring levers adapted to be operated by a human user; and wherein said rear means comprises a plurality of rear locking levers adapted to be operated by mechanical means external to said magazine.

3. The magazine of claim 2 wherein said safety bar comprises a bar extending under all of said plurality of rear locking levers, said safety bar having a length which extends at least along all of said plurality of rear locking levers.

4. The magazine of claim 3 further comprising:

said retaining means nominally retaining said safety bar in a first position which locks said rear locking levers, wherein said safety bar is moveable to a second position to unlock said rear locking levers.

5. The magazine of claim 4 wherein said retaining means further comprises:

a spring attached to said safety bar; and a slot in said frame adapted to permit movement of said safety bar to said second position by engaging said mechanical means external to said magazine.

6. The magazine of claim 5 wherein said frame comprises a horizontal slot floor, a top, and sidewalls, wherein braces extend from said top to said horizontal slot floor, and wherein a handle is attached to each of said sidewalls, and wherein said plurality of slots is extending vertically between said horizontal slot floor and said top.

7. The magazine of claim 6 wherein said handles are attached to said front side of said frame.

8. The magazine of claim 7 wherein a bottom cover is attached to an underside of said slot floor, said front spring levers and said rear locking levers having portions extending between said slot floor and said bottom cover.

9. The magazine of claim 8 wherein said front spring levers and said rear locking levers form a lever assembly consisting of a single piece of material.

10. The magazine of claim 9 wherein said material is selected from the group consisting of plastic and metal.

11. A magazine for holding data storage cartridges comprising:
- a frame comprising a top, a slot floor, and sidewalls, said sidewalls connecting said top and slot floor;
- a plurality of slots surrounded by said frame, each of said plurality of slots extending vertically between said slot floor and top of said frame;
- a plurality of front spring levers on a front side of said frame, said front spring levers located adjacent to said slot floor and associated with each of said plurality of slots, and wherein said front spring levers are operable to allow an individual data storage cartridge to be inserted or extracted from said front side of said frame by depression of said front spring levers;
- a plurality of rear locking levers on a rear side of said frame, said rear locking levers located adjacent to said slot floor, and associated with each of said plurality of slots, and wherein said rear locking levers are operable to allow an individual data storage cartridge to be inserted or extracted from said rear side of said frame by depression of said rear locking levers;
- a safety bar located at the rear of said frame, said safety bar extending under each of said rear locking levers, said safety bar adapted to simultaneously lock all of said plurality of rear locking levers in place by preventing the depression of said rear locking levers, and wherein said safety bar is operable independent of said depression of said rear locking levers; and a spring for biasing said safety bar in a direction toward the rear side of said frame to prevent depression of said rear locking levers, whereby in order to enable depression of said rear locking levers, a force exceeding the force of said spring is applied to said safety bar in a direction toward said front side of said frame such that said safety bar is linearly slid in a direction toward said front side of said frame.

12. The magazine of claim 11 wherein said frame further comprises a bottom cover attached to said slot floor, wherein said safety bar extends between said bottom cover and said slot floor, and wherein said bottom cover has a rear face, said rear face having slots adapted to provide access to said safety bar for a robotic arm which disengages said safety bar.

13. The magazine of claim 12 wherein said frame has braces extending from said slot floor to said top, and a handle extending from said front side of each said sidewall.

14. The magazine of claim 12 wherein said spring maintains said safety bar in a locked position, and wherein said safety bar is in said locked position when said safety bar is directly under a lever stop attached to an underside of said rear locking levers.

* * * * *